Patented June 10, 1952

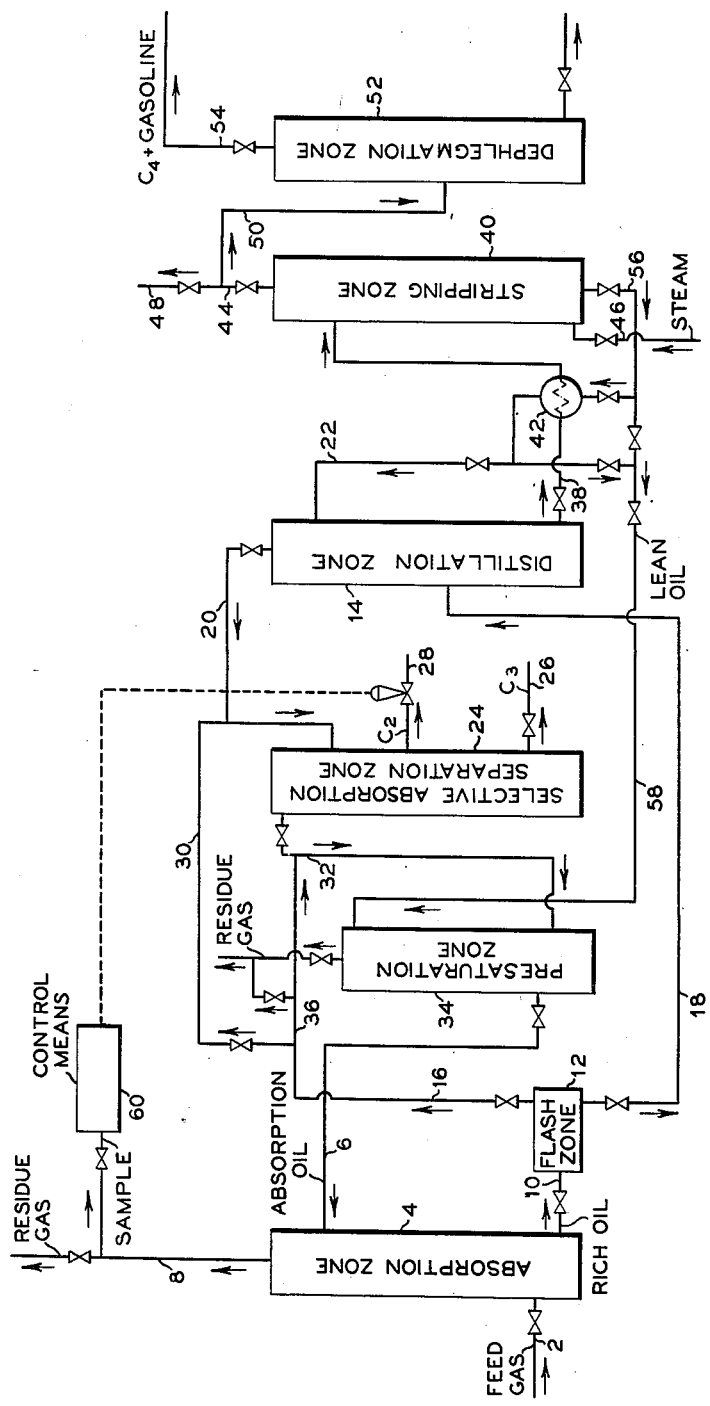

2,600,133

UNITED STATES PATENT OFFICE 2,600,133

MAINTAINING B. T. U. CONTENT OF RESIDUE GAS FROM ABSORBER

Russell K. Simms, Bartlesville, Okla., assignor to Phillips Petroleum Company, a corporation of Delaware Application October 27, 1949, Serial No. 123,938

4 Claims. (Cl. 196—8)

This invention relates to the treatment of hydrocarbons. In one of its more specific aspects it relates to separating and recovering low-boiling normally gaseous hydrocarbon materials from a gaseous mixture comprising said low-boiling normally gaseous hydrocarbon materials, higher boiling hydrocarbon materials and lower boiling normally gaseous hydrocarbon materials. In another of its more specific aspects it relates to recovering $C_2$ hydrocarbons, liquefied petroleum gases, including $C_2$, $C_3$ and $C_4$ hydrocarbons, and gasoline from a natural gas or other gaseous hydrocarbon streams comprising saturated and/or unsaturated $C_1$ to more than $C_5$ hydrocarbons and other low-boiling normally gaseous materials.

Natural gasoline hydrocarbons may be readily extracted and recovered from natural gas by the well known absorption-distillation process. It is also possible to extract and recover a major portion of the butane present in natural gas, some of the propane and a minor amount of ethane by modifying and improving this process. Some of these well known improvements comprise recompression and further extraction of light hydrocarbon vapors, reabsorption, desorption, 2-stage distillation, rich absorption oil demethanization, and flash-flood distillation which utilizes recycling of partially flashed rich oil.

With increased demands for propane and butane as L. P. G. fuels and as raw materials for numerous chemical processes, such as alkylation, polymerization, dehydrogenation, oxidation, etc., it has become very important to find ways of increasing recovery of propane and butane from gaseous mixtures. However, the improved absorption-distillation processes which are known in the prior art are relatively complicated processes requiring excessive investments in equipment and are expensive to operate. In addition, new high temperature, low pressure processes have been developed to convert ethane to ethylene, which is the starting material for the synthesis of a wide variety of chemical products, such as ethylene oxide, ethylene glycol, etc. These new processes utilize a moving bed of a refractory material, usually refractory pebbles. The refractory material is preheated and passed into contact with the ethane giving up heat to convert the ethane to ethylene. Natural gas, preferably defined as a gaseous mixture comprising saturated $C_1$ to more than $C_5$ hydrocarbons and other low-boiling normally gaseous materials, such as $N_2$, $H_2S$, $CO_2$, etc., is the most readily available source of ethane, but the most modern gasoline plant, employing improved absorption-distillation processes, can extract and recover only a minor percentage of the ethane available in the natural gas. The ethane may be readily absorbed especially in oil absorbers operating under relatively high pressures within the range of 400 to 2,000 pounds per square inch absolute, or even higher pressures up to 5,000 pounds per square inch absolute. However, due to the relationship of the equilibrium constants, very substantial quantities of methane are simultaneously absorbed along with the ethane. When the absorbed hydrocarbons are separated from the rich absorption oil, it is impossible to recover and retain most of the ethane because of the undesirable absorbed methane. The ethane is lost from the system with methane with the flashing, stripping, distillation, etc., steps employed in known processes. Improved processes have been developed to try to overcome this difficulty, such as recompression of the uncondensable plant vapors and subsequent reabsorption, but even with all of the recycling, requiring a high expenditure of power, the amount of ethane actually recovered is relatively small in comparison to the amount available for recovery. Furthermore, in such an operation there remains, after recompression and reabsorption, a considerable quantity of uncondensed residue vapors comprising methane and ethane which are usually desired in the residue gas stream for sale to a utility pipe line. Usually these vapors must be recompressed from pressures of the order of 200 pounds per square inch absolute to pressures in the range of 400 to 2,000 pounds per square inch absolute to permit injection into a utility pipe line. This recompression is very expensive.

Selective adsorption separation processes, such as a recently developed continuous moving bed activated-charcoal selective adsorption process, are now affording selective and efficient means for separating and recovering low-boiling normally gaseous hydrocarbons. Such processes can be used to recover a high percentage of a light hydrocarbon, such as ethane, from a mixture of low-boiling normally gaseous hydrocarbons, and such processes also have the advantage of producing recovered hydrocarbons of high purity. Actually, these adsorption processes are not as economical for extracting ethane as is oil absorption, but these adsorption processes are more selective. However, the recently developed continuous moving bed selective adsorption separation process referred to hereinbefore will not operate economically at pressures above about 400 pounds per square inch absolute, and the preferred operating pressure is 200 pounds per square inch absolute or lower. Much of the natural gas available in this country is available from large reservoirs having a pressure in the range of 400 to 2,000 pounds per square inch absolute and sometimes even at higher pressures up to 5,000 pounds per square inch absolute. In the well known cycling plants the natural gas is processed by oil absorption for the extraction of natural gasoline and L. P. G. hydrocarbons, and the residue is recycled to the reservoir. To make such operations economically feasible, the oil absorption must be carried on at pressures approximating the reservoir pressure so as to minimize the recompression of the residue gas which may comprise 90 per cent or more of the gas processed and which must be recycled to the reservoir. Even if the residue gas is not recycled, it is delivered to a utility pipe line which must operate at relatively high pressures ranging up to 1,000 pounds per square inch absolute and sometimes higher. In either case, it is not economically feasible to utilize the continuous moving bed activated-charcoal selective adsorption separation process to extract ethane from the oil absorption residue gas without reducing the pressure to 400 pounds per square inch absolute or below and then recompressing the methane residue gas, resulting from removing the ethane, to the original reservoir pressure or to the high pressure required for injection into a utility pipe line. Furthermore, it is essential that the raw gas be passed into a conventional oil absorber to remove substantially all of the $C_5+$hydrocarbon components prior to selective adsorption separation processes using adsorbents such as activated-charcoal, silica gel, etc. When this oil absorption is done a substantial quantity of $C_3$ and $C_4$ hydrocarbons and a lesser amount of methane and $C_2$ hydrocarbons are simultaneously absorbed and thus the absorption-distillation plant problems still exist even if a selective adsorption separation process is used to extract ethane from the oil absorption plant residue.

I have invented a process for treating gaseous hydrocarbon material mixtures comprising low-boiling normally gaseous hydrocarbon materials, such as propane, butane and/or ethane, lower boiling normally gaseous hydrocarbon material, such as methane and/or ethane, and higher boiling hydrocarbon materials, such as $C_5$ and higher boiling hydrocarbons. The process of my invention is particularly applicable to treating natural gas to separate and recover ethane, propane, butane and natural gasoline. My invention comprises first contacting the above-mentioned mixture with a lean presaturated absorption medium, such as absorption oil, in an absorption zone, thereby absorbing said low-boiling normally gaseous hydrocarbon materials, higher boiling hydrocarbon materials and a portion of said lower-boiling normally gaseous hydrocarbon materials. Absorption is carried on under conditions whereby the lowest boiling hydrocarbon desired to be recovered is absorbed. Unabsorbed hydrocarbon materials are withdrawn from said absorption zone. A resulting rich absorption medium is withdrawn from the absorption zone and is passed into a first separation zone. Therein absorbed low-boiling and lower boiling hydrocarbon materials are separated from the absorption medium and are withdrawn from this first separation zone. These withdrawn low and lower boiling hydrocarbon materials are passed into a selective adsorption separation zone wherein they are separated, recovering a stream of low-boiling normally gaseous hydrocarbon materials and a stream of lower boiling hydrocarbon materials. The stream of lower boiling hydrocarbon materials separated and recovered in the selective adsorption separation zone are passed into a presaturation zone wherein they are contacted with a stream of lean adsorption oil to presaturate same before it is introduced into the absorption zone. The rich absorption medium which has been partially denuded of absorbed hydrocarbons and containing said higher boiling hydrocarbon materials is withdrawn from the first separation zone and is passed into a second separation zone wherein the higher boiling hydrocarbon materials are separated from the absorption medium, thus making the absorption medium available for recycling. This lean absorption medium is presaturated as hereinbefore set forth prior to its reintroduction into the absorption zone, thus affording a means to control the amount of low-boiling hydrocarbon material absorbed in the absorption zone.

In a modification of the process of my invention I find it desirable to use a portion of the lean absorption medium to control the end-point of the hydrocarbon vapor stream passed to the selective adsorption separation zone from the first separation zone. This internally cycled lean absorption medium stream is referred to as a reflux stream.

In another modification of the process of my invention I find that I can control the composition of the gaseous hydrocarbon material stream from the absorption zone by regulating the amount of low-boiling normally gaseous material separated and recovered in the selective adsorption separation zone. This control is accomplished by indirectly regulating the amount of presaturation of the lean absorption medium. This is a particularly advantageous modification of the process of my invention since I can, by this modification, maintain constant B. t. u. value of the unabsorbed gaseous hydrocarbon material from the absorption zone.

The process of my invention has many advantages. Since the process of my invention is particularly applicable to treating a natural gas, defined as a gaseous mixture comprising saturated $C_1$ to more than $C_5$ hydrocarbons and other low-boiling normally gaseous materials, the following advantages of the process of my invention are set forth with regard to treating such a natural gas. However, one skilled in the art can readily see that the advantages will hold true no matter what the composition of the gas stream. My invention eliminates the compressors usually present in a conventional gasoline plant. A raw natural gasoline is produced which comprises butane and heavier hydrocarbons, whereas in conventional gasoline plants the raw gasoline contains a minor quantity of methane together with heavier hydrocarbons and thus it must be treated in two stages of fractional distillation, each of which must be operated with relatively high pressure and in some instances with refrigeration for de-ethanization and de-propanization. As a result of treating natural gas by the process of my invention, a propane stream of high purity is made available for L. P. G. markets without the fractional distillation steps normally required in conventional practice. An ethane stream of high purity is available as feed to a high temperature, low pressure ethane conversion process. In addition, the extraaction and recovery of ethane and propane can be readily controlled at any desired level without recompression, reabsorption or excessive recycling, all of which are commonplace in a conventional treating plant. Ethane and higher boiling components are extracted from a natural gas under high pressures, that is, under wet field gas or reservoir pressure. The unextracted residue gas is maintained at approximately the same pressure as the feed gas to the absorption step.

It is an object of my invention to provide a process for treating hydrocarbons.

It is another object of my invention to provide a process for separating and recovering low-boiling normally gaseous hydrocarbon materials, lower boiling normally gaseous hydrocarbon materials and higher boiling hydrocarbon materials from a gaseous mixture comprising same.

It is still another object of my invention to provide a process to increase extraction of ethane and higher boiling hydrocarbons from a natural gas and to yield a residue gas of constant B. t. u. value.

A further object of my invention is to provide a process whereby the extraction of hydrocarbon components from a natural gas may be selectively controlled to yield a residue gas having a desired B. t. u. value.

It is a still further object of my invention to provide a process by which the foregoing objects may be accomplished with less equipment and less power than is required for conventional processes.

Other objects and advantages of the process of my invention will become apparent, to one skilled in the art, upon reading this disclosure.

The drawing which accompanies this disclosure and which is a part of this disclosure is a schematic flow sheet depicting a preferred specific embodiment of the process of my invention which is particularly applicable to treating a gaseous mixture comprising $C_1$ to more than $C_5$ hydrocarbons and other low-boiling normally gaseous materials to separate and recover a methane residue gas stream, a $C_2$ hydrocarbon stream of high purity, a $C_3$ hydrocarbon stream of high purity and a hydrocarbon stream comprising $C_4$'s and higher boiling hydrocarbons.

The following is a discussion of a preferred specific embodiment of the process of my invention wherein a natural gas comprising saturated $C_1$ to more than $C_5$ hydrocarbons and other low-boiling normally gaseous materials is treated. The temperatures, pressures, compositions, etc., set forth are not to unduly limit the scope of my invention, and it is to be understood that the following discussion is not to limit the type of application to which the process of my invention can be applied.

In addition to what has been set forth hereinbefore, the process of my invention finds ready application to refinery residue gas streams which normally contain unsaturated as well as saturated hydrocarbons.

Referring now to the drawing, the raw feed gas is passed via line 2 into oil absorption zone 4 wherein the feed gas is countercurrently and directly contacted with a lean presaturated absorption oil passed into absorption zone 4 via line 6. The absorption is carried on under conditions of pressure and temperature so as to absorb ethane and higher boiling hydrocarbons. Unabsorbed residue gas comprised predominantly of methane, $N_2$, etc., is withdrawn from absorption zone 4 and the system via line 8. I prefer to absorb at the reservoir pressure or even higher pressures as such are usually required for the residue gas market or for recycling, and thus I take advantage of high pressures to obtain the maximum absorption in absorption zone 4.

Resulting rich absorption oil is withdrawn from absorption zone 4 via line 10 and is passed into a first separation zone. On the drawing this separation zone is represented by flash zone 12 and distillation zone 14. The rich absorption oil first enters flash zone 12 where, by reducing pressure, methane and a small amount of ethane is separated from the absorption medium and is withdrawn from flash zone 12 via line 16. This methane stream withdrawn via line 16 may be passed into a presaturation zone or it may be passed into a selective adsorption separation zone or it may be withdrawn from the system as residue gas, as will hereinafter be set forth. The rich absorption oil resulting from the flashed off methane stream is withdrawn from flash zone 12 via line 18 and is passed into distillation zone 14 which, in this operation, is referred to as a depropanizer.

In depropanizer 14 propane and lower boiling hydrocarbons are removed from the rich absorption oil and are withdrawn overhead via line 20. The endpoint of the propane and lower boiling stream withdrawn overhead from depropanizer 14 is preferably controlled by contacting the overhead vapors with lean absorption oil in the upper portion of depropanizer 14. This lean absorption oil is passed into distillation zone 14 via line 22. The lean absorption oil is obtained as a result of a stripping operation which is set forth hereinafter.

The propane and lower boiling hydrocarbon stream withdrawn via line 20 is passed into selective adsorption separation zone 24 which can be a fixed-bed, cyclic fixed-bed separation process, utilizing a selective adsorbent, such as activated-charcoal, silica gel, etc., but which is preferably a continuous moving bed selective adsorption separation process utilizing activated-charcoal as the selective adsorbent and operating at a pressure of from 100 to 200 pounds per square inch absolute. The propane is selectively adsorbed and subsequently desorbed to produce a propane stream of high purity which is withdrawn from selective adsorption separation zone 24 via line 26. Likewise, ethane is selectively adsorbed and subsequently desorbed to produce an ethane stream of high purity which is withdrawn via line 28. The methane stream withdrawn from flash zone 12 via line 16 can be combined via line 30 with the depropanizer overhead stream and fed to selective adsorption separation zone 24. This methane feed stream normally contains some ethane which can be recovered. Some of the ethane present in the feed to selective adsorption separation zone 24 along with methane and other low-boiling normally gaseous hydrocarbon materials is withdrawn from selective adsorption separation zone 24 via line 32 and is passed into presaturation zone 34. If desired, the methane stream containing some ethane withdrawn from flash zone 12 via line 16 may be combined with the vaporous feed stream to presaturation zone 34 via line 36.

Within presaturation zone 34 lean absorption oil produced as hereinafter set forth is presaturated with ethane and some methane by directly and countercurrently contacting the lean absorption oil and vaporous hydrocarbons. The amount of presaturation is determined by the amount of ethane which it is desired to absorb from the feed gas in absorption zone 4. This method of operation is very advantageous since it allows me to regulate the B. t. u. value of the residue gas withdrawn from the system via line 8.

Rich absorption oil resulting from depropanization in depropanizer 14 is withdrawn via line 38 and is passed into stripping zone 40. This rich absorption oil can be preheated in heat exchanger zone 42, preferably by indirect heat exchange with resulting denuded lean absorption oil, and any propane vapors formed may be withdrawn from the system by venting means not shown on the drawing. In stripping zone 40 $C_4$ and higher boiling hydrocarbons absorbed in absorption zone 4 are stripped from the absorption oil, preferably at a temperature of from 200 to 450° F. and a pressure of from 30 to 100 pounds per square inch absolute. They are withdrawn overhead via line 44. Stripping steam can be used, and desirably so, being introduced into stripping zone 40 via line 46. The $C_4$ and higher boiling hydrocarbons can be withdrawn from the system via line 48, to be used as desired, or they can be passed via line 50 into a dephlegmation zone 52. If further fractionation is carried on in dephlegmation zone 52, $C_4$ and higher boiling hydrocarbons are ultimately withdrawn from the system via line 54.

Lean absorption oil is withdrawn from stripping zone 40 via line 56. A portion of this lean absorption oil is passed into depropanizer 14 via line 22 to better control the end-point of the overhead vapors from depropanizer 14, and the remainder of the lean absorption oil is passed via line 58 into the upper portion of presaturation zone 34 wherein the lean oil is presaturated as hereinbefore set forth prior to its reintroduction into absorption zone 4 via line 6. Hot lean absorption oil from stripping zone 40 can be used to preheat the partially denuded rich oil feed to stripping zone 40. The schematic piping diagram around heat exchanger zone 42 indicates this heat exchange, thus providing cool lean absorption oil for service in depropanizer 14 and presaturator 34. Of course, other heat exchange schemes can be used if desired.

Frequently the residue gas from absorber 4 is marketed with a specified B. t. u. content. If the residue is being marketed to a utility pipe line, the B. t. u. content usually must be maintained approximately constant at all times. In the process of my invention I provide a means for maintaining the residue gas at a predetermined B. t. u. content by control means 60, continuously responsive to the B. t. u. value of the residue gas and which, in turn, controls the amount of ethane withdrawn via line 28 from the continuous moving bed activated-charcoal selective adsorption separation zone 24. Control means 60 can be any suitable control device, such as a recording, controlling calorimeter, a recording, controlling spectrophotometer, using ultra violet or infra-red rays, or a recording, controlling gravitometer. As an example of how my control means works, if the B. t. u. content of the residue gas falls below a predetermined value, the recording, controlling calorimeter will function so as to reduce the ethane withdrawn from the selective adsorption separation zone and thereby increases the quantity of ethane passing overhead from said zone to presaturator 34. As a result of this action, the presaturated lean oil passing to the top of absorption zone 4 will contain an increased quantity of ethane, thereby reducing the ethane absorption in absorber 4. As the absorption of ethane is decreased, the quantity of ethane in the residue gas increases and thus the B. t. u. value of the residue gas is returned to the predetermined value, and the calorimeter then functions to increase the withdrawal of ethane via line 28 from selective adsorption separation zone 24. When using the above set forth control means in the process of my invention, I prefer to regulate the amount of presaturation by varying the amount of ethane withdrawn from selective adsorption separation zone 24, that is, removing the flash zone vapors withdrawn via line 16 from the system as residue gas or introducing same into the feed stream to selective adsorption separation zone 24.

The above set forth preferred specific embodiment of the process of my invention, and the drawing which accompanies and is a part of this disclosure, will serve as examples of the application of the process of my invention. However, such preferred specific embodiment and drawing are not to unduly limit the scope of my invention.

As will be evident to those skilled in the art, various modifications of this invention can be made, or followed, in the light of this disclosure and discussion, without departing from the spirit or scope of this disclosure or from the scope of the claims.

I claim:

1. A process for treating a gaseous mixture comprising $C_1$ to more than $C_5$ hydrocarbons and other low-boiling normally gaseous materials, which comprises: passing said gaseous mixture into an absorption zone operating at a pressure of from 400 to 2,000 pounds per square inch absolute and therein countercurrently and directly contacting same with lean presaturated absorption oil thereby absorbing $C_2$ and higher boiling hydrocarbons; withdrawing unabsorbed gaseous material from said absorption zone; withdrawing a resulting rich absorption oil from said absorption zone, passing same into a flash zone and by reducing pressure thereon removing a portion of absorbed methane and $C_2$ hydrocarbons from said rich absorption oil; withdrawing a resulting rich absorption oil from said flash zone, passing same into a depropanization zone and therein removing $C_3$ and lower boiling hydrocarbons from same and from said depropanization zone, controlling the end-point of resulting $C_3$ and lower boiling hydrocarbon vapors by directly and countercurrently contacting hydrocarbon vapors produced with a lean absorption oil passed into the upper portion of said depropanization zone and produced as hereinafter set forth; passing resulting $C_3$ and lower boiling hydrocarbons into a continuous moving bed activated-charcoal selective adsorption separation zone operating at a pressure of from 100 to 200 pounds per square inch absolute, therein separating and recovering a $C_2$ hydrocarbon stream and a $C_3$ hydrocarbon stream and withdrawing a methane stream containing a portion of $C_2$ hydrocarbons passed into said selective adsorption separation zone; controlling the amount of $C_2$ hydrocarbons contained in the methane stream in response to the variation of the B. t. u. content of the unabsorbed gaseous material withdrawn from the absorption zone so as to maintain said B. t. u. content constant; passing said methane stream into a presaturation zone, therein presaturating a lean absorption oil by absorbing a portion of said methane stream and withdrawing an unabsorbed portion of said methane stream from said presaturation zone; withdrawing absorption oil containing $C_4$ and higher boiling hydrocarbons from said depropanization zone, passing same into a stripping zone operating at a pressure of from 30 to 100 pounds per square inch absolute and at a temperature of from 200 to 450° F. and therein separating and recovering said $C_4$ and higher boiling hydrocarbons from same; withdrawing resulting lean absorption oil from said stripping zone, passing a portion of same into said depropanization zone as hereinbefore set forth and passing a remaining portion of same into said presaturation zone and presaturating same as hereinbefore set forth; and withdrawing resulting presaturated absorption oil from said presaturation zone and passing same into said absorption zone as said lean presaturated absorption oil contacted with said mixture.

2. A process for treating a gaseous mixture comprising $C_1$ to more than $C_5$ hydrocarbons and other low-boiling normally gaseous materials, which comprises: passing said gaseous mixture into an absorption zone and therein countercurrently and directly contacting same with lean presaturated absorption oil under conditions of temperature and pressure so as to absorb $C_2$ and higher boiling hydrocarbons; withdrawing an unabsorbed gaseous material from said absorption zone; withdrawing a resulting rich absorption oil from said absorption zone, passing same into a flash zone and by reducing pressure thereon removing a portion of absorbed methane and $C_2$ hydrocarbons from said rich absorption oil; withdrawing a resulting rich absorption oil from said flash zone, passing same into a distillation zone and therein removing $C_3$ and lower boiling hydrocarbons from same and from said distillation zone, controlling the end-point of resulting $C_3$ and lower boiling hydrocarbon vapors by directly and countercurrently contacting hydrocarbon vapors produced with a lean absorption oil passed into the upper portion of said distillation zone and produced as hereinafter set forth; passing resulting $C_3$ and lower boiling hydrocarbons into a selective adsorption separation zone, therein separating and recovering $C_2$ and $C_3$ hydrocarbons and withdrawing a methane stream containing a portion of $C_2$ hydrocarbons passed into said selective adsorption separation zone; controlling the amount of $C_2$ hydrocarbons contained in the methane stream in response to the variation of the B. t. u. content of the unabsorbed gaseous material withdrawn from the absorption zone so as to maintain said B. t. u. content constant; passing said methane stream into a presaturation zone, therein presaturating a lean absorption oil by absorbing a portion of said methane and withdrawing an unabsorbed portion of said methane from said presaturation zone; withdrawing absorption oil containing $C_4$ and higher boiling hydrocarbons from said distillation zone, passing same into a stripping zone and therein separating and recovering said $C_4$ and higher boiling hydrocarbons from same; withdrawing resulting lean absorption oil from said stripping zone, passing a portion of same into said distillation zone as hereinbefore set forth and passing a remaining portion of same into said presaturation zone and presaturating same as hereinbefore set forth; and withdrawing resulting presaturated absorption oil from said presaturation zone and passing same into said absorption zone as said lean presaturated absorption oil contacted with said mixture.

3. A process for treating a gaseous mixture comprising $C_1$ to more than $C_5$ hydrocarbons and other low-boiling normally gaseous materials which comprises: passing said gaseous mixture into an absorption zone and therein countercurrently and directly contacting said gaseous mixture with lean presaturated absorption oil under conditions of pressure and temperature so as to absorb $C_3$ and higher boiling hydrocarbons; withdrawing an unabsorbed gaseous material from said absorption zone; withdrawing a resulting rich absorption oil from said absorption zone, passing same into a flash zone and by reducing pressure thereon removing a portion of absorbed $C_2$ and $C_3$ hydrocarbons from said rich absorption oil; withdrawing a resulting rich absorption oil from said flash zone, passing same into a distillation zone and therein removing $C_4$ and lower boiling hydrocarbons from same and from said distillation zone, controlling the end-point of resulting $C_4$ and lower boiling hydrocarbon vapors by directly and countercurrently contacting hydrocarbon vapors produced with a lean absorption oil passed into the upper portion of said distillation zone and produced as hereinafter set forth; passing resulting $C_4$ and lower boiling hydrocarbons into a selective adsorption separation zone, therein separating and recovering $C_3$ and $C_4$ hydrocarbons and withdrawing a $C_2$ hydrocarbon stream containing a portion of $C_3$ hydrocarbons passed into said selective absorption separation zone; controlling the amount of $C_3$ hydrocarbons contained in the $C_2$ hydrocarbon stream in response to the variation of the B. t. u. content of the unabsorbed gaseous material withdrawn from the absorption zone so as to maintain said B. t. u. content constant; passing said $C_2$ hydrocarbon stream into a presaturation zone, therein presaturating a lean absorption oil by absorbing a portion of same and withdrawing an unabsorbed portion of same from said presaturation zone; withdrawing absorption oil containing $C_5$ and higher boiling hydrocarbons from said distillation zone, passing same into a stripping zone and therein separating and recovering said $C_5$ and higher boiling hydrocarbons from same; withdrawing resulting lean absorption oil from said stripping zone, passing a portion of same into said distillation zone as hereinbefore set forth and passing a remaining portion of same into said presaturation zone and presaturating same as hereinbefore set forth; and withdrawing resulting presaturated absorption oil from said presaturation zone and passing same into said absorption zone as said lean presaturated absorption oil contacted with said mixture.

4. A process for treating a gaseous hydrocarbon material mixture comprising low-boiling normally gaseous hydrocarbon materials, lower boiling normally gaseous hydrocarbon materials and higher boiling hydrocarbon materials which comprises: passing said mixture into an absorption zone and therein contacting same with a lean presaturated absorption medium and absorbing said low-boiling normally gaseous hydrocarbon materials, higher boiling hydrocarbon materials and a portion of said lower-boiling normally gaseous hydrocarbon materials; withdrawing unabsorbed hydrocarbon materials from said absorption zone; withdrawing a resulting rich absorption medium from said absorption zone and passing same into a first separation zone, therein separating said absorbed low-boiling and lower boiling hydrocarbon materials from same and withdrawing a gaseous stream of low and lower boiling normally gaseous hydrocarbon materials from said first separation zone; passing said gaseous stream of low and lower boiling hydrocarbon materials into a selective adsorption separation zone, therein separating and recovering a stream of low-boiling normally gaseous hydrocarbon materials and withdrawing a stream of lower boiling hydrocarbon materials; controlling the amount of low-boiling normally gaseous hydrocarbon materials withdrawn in response to the variation of the B. t. u. content of the unabsorbed hydrocarbon materials withdrawn from the absorption zone so as to maintain said B. t. u. content constant; passing said stream of low-boiling and lower boiling hydrocarbon materials into a presaturation zone, therein presaturating a lean absorption medium by absorbing a portion of same; withdrawing an absorption medium containing said higher boiling hydrocarbon materials from said first separation zone and passing same into a second separation zone, therein separating said higher boiling hydrocarbon materials from same and withdrawing resulting higher boiling hydrocarbon materials and a resulting lean absorption medium from said second separation zone; passing said withdrawn lean absorption medium into said presaturation zone and presaturating same as hereinbefore set forth; and withdrawing resulting presaturated absorption medium from said presaturation zone and passing same into said absorption zone as said lean presaturated absorption medium contacted with said mixture.

RUSSELL K. SIMMS.

REFERENCES CITED

The following references are of record in the file of this patent:

UNITED STATES PATENTS

| Number | Name | Date |
|---|---|---|
| 2,074,978 | Brandt | Mar. 23, 1937 |
| 2,169,959 | Brandt | Aug. 15, 1939 |
| 2,181,633 | Hutchinson | Nov. 28, 1939 |
| 2,249,885 | Carney | July 22, 1941 |
| 2,318,752 | Carney | May 11, 1943 |
| 2,355,588 | Brandt | Aug. 8, 1944 |
| 2,468,750 | Gudenrath | May 3, 1949 |

OTHER REFERENCES

McCullough et al., Petroleum Processing, vol. 3, pages 307-310, April 1948.

Berg, Trans. Am. Inst. of Chemical Engineers, vol. 42, pages 665-680 (1946).